(No Model.)
R. J. MORTON.
Stirrer for Coffee Roasters.
No. 240,448. Patented April 19, 1881.
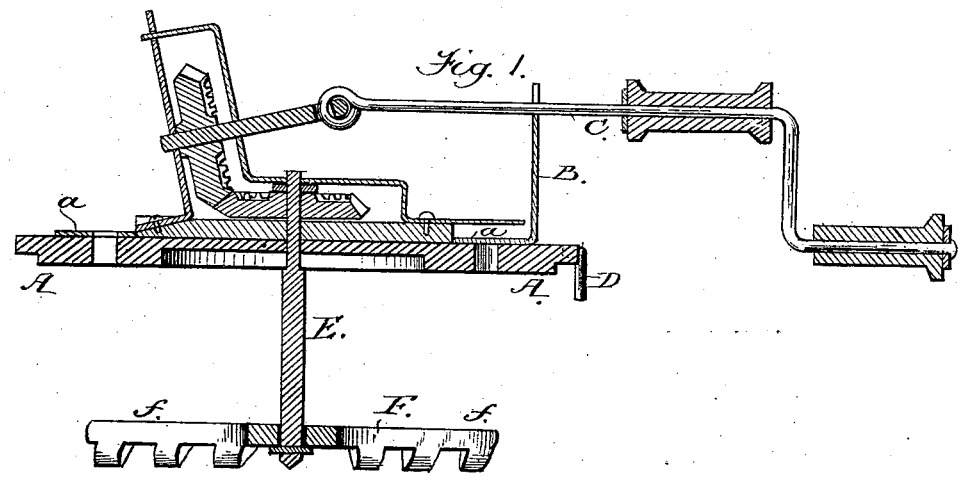
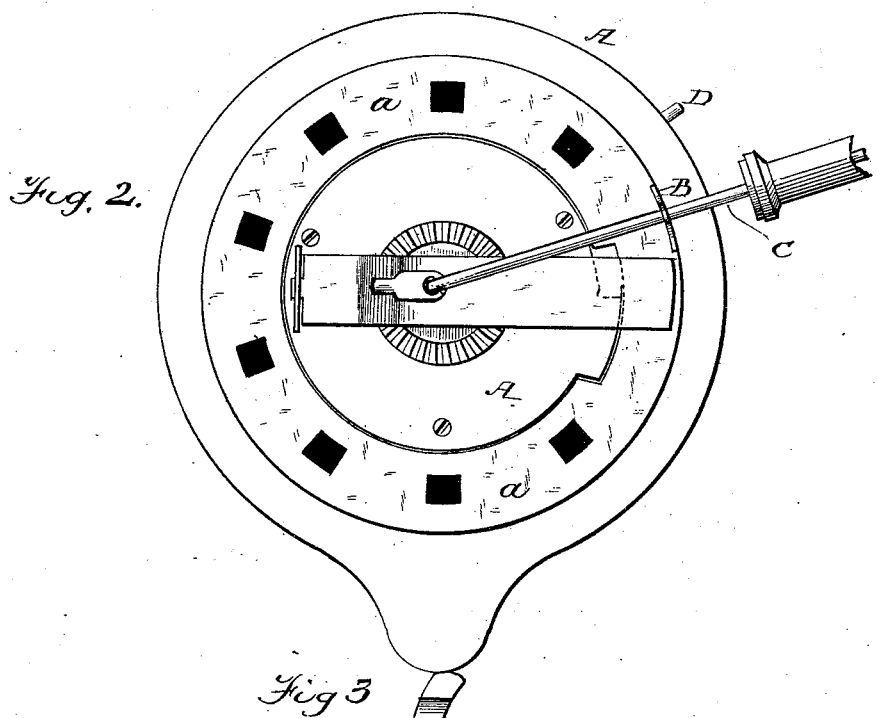
Witnesses:
T. Walter Fowler
D. P. Cowl
Inventor:
Rufus J. Morton
per atty
A. H. Evans & Co

1
UNITED STATES PATENT OFFICE.

RUFUS J. MORTON, OF BIG LICK, NORTH CAROLINA.

STIRRER FOR COFFEE-ROASTERS.

SPECIFICATION forming part of Letters Patent No. 240,448, dated April 19, 1881.

Application filed January 19, 1881. (No model.)

*To all whom it may concern:*

Be it known that I, RUFUS J. MORTON, of Big Lick, North Carolina, have invented a new and useful Improvement in Stirrers for Coffee-Roasters, of which the following is a clear, full, and exact description, reference being made to the accompanying drawings, making a part of this specification, in which—

Figure 1 represents a vertical section of a stirrer with my improvement attached. Fig. 2 represents a plan view of the same. Fig. 3 shows a plan view of the stirrers.

My invention has reference to stirrers used in coffee-roasters, and is an improvement on Patent No. 225,758, granted to me March 23, 1880; and it consists in the combination of devices hereinafter described and claimed.

To enable others skilled in the art to make and use my invention, I will proceed to describe the exact manner in which I have carried it out.

In the drawings, A shows the cover for the roaster, with the necessary mechanism for revolving the stirrers, placed on the top, as shown in my patent above referred to. The cover A is perforated, as shown in Fig. 2, and provided with a revolving slide, $a$, having similar perforations.

On the slide $a$ is secured the upright handle B, by which the slide is moved when it is desired to open or close the perforations, for a purpose hereinafter explained. This handle also serves for a rest for the crank-spindle C when not in use.

On the edge of the cover I place the stop D, which, by coming in contact with the handle of the vessel, prevents the sliding or other movement of the cover.

The vertical shaft E, which passes through the cover and conveys motion to the stirrers, is made square below the cover, and is slightly pointed at its lower end, to cause it the more readily to penetrate the coffee when the lid or cover A is being placed on the roaster.

The stirrer-frame F has a square opening fitting loosely upon the square vertical shaft E, by which construction the stirrer-frame is allowed to rest upon the top of the coffee, while the shaft penetrates to the bottom and allows the cover to be secured in position.

Extending from the stirrer-frame F are the bent arms $f\,f\,f$, which, by their bent form, as shown in Fig. 3, draw the coffee from the edge of the roaster and move it constantly toward the center of the vessel. The inclined position given these arms and their teeth causes the arms gradually to work down through the coffee until they reach the bottom of the vessel.

When it is desired to see the coffee it is only necessary to move the slide $a$ by means of the handle B, and thus open the perforations in the cover, through which the coffee can be readily inspected.

Having thus explained my invention, what I claim as new, and desire to secure by Letters Patent, is—

1. In a coffee-roaster, the perforated cover A, provided with slide $a$, having similar perforations, and provided with the handle B, in combination with the stop D, substantially as and for the purpose specified.

2. The square vertical shaft E, having its lower end slightly pointed, in combination with the loosely-fitting stirrer-frame F, provided with two or more bent and inclined arms, $f$, constructed to operate substantially as and for the purpose described.

RUFUS JOSHUA MORTON.

Witnesses:
JAMES H. WALTERS,
W. F. STUBBS.